Jan. 31, 1967 H. R. GREENE 3,302,035
TRANSMISSION SYSTEM
Filed April 30, 1963
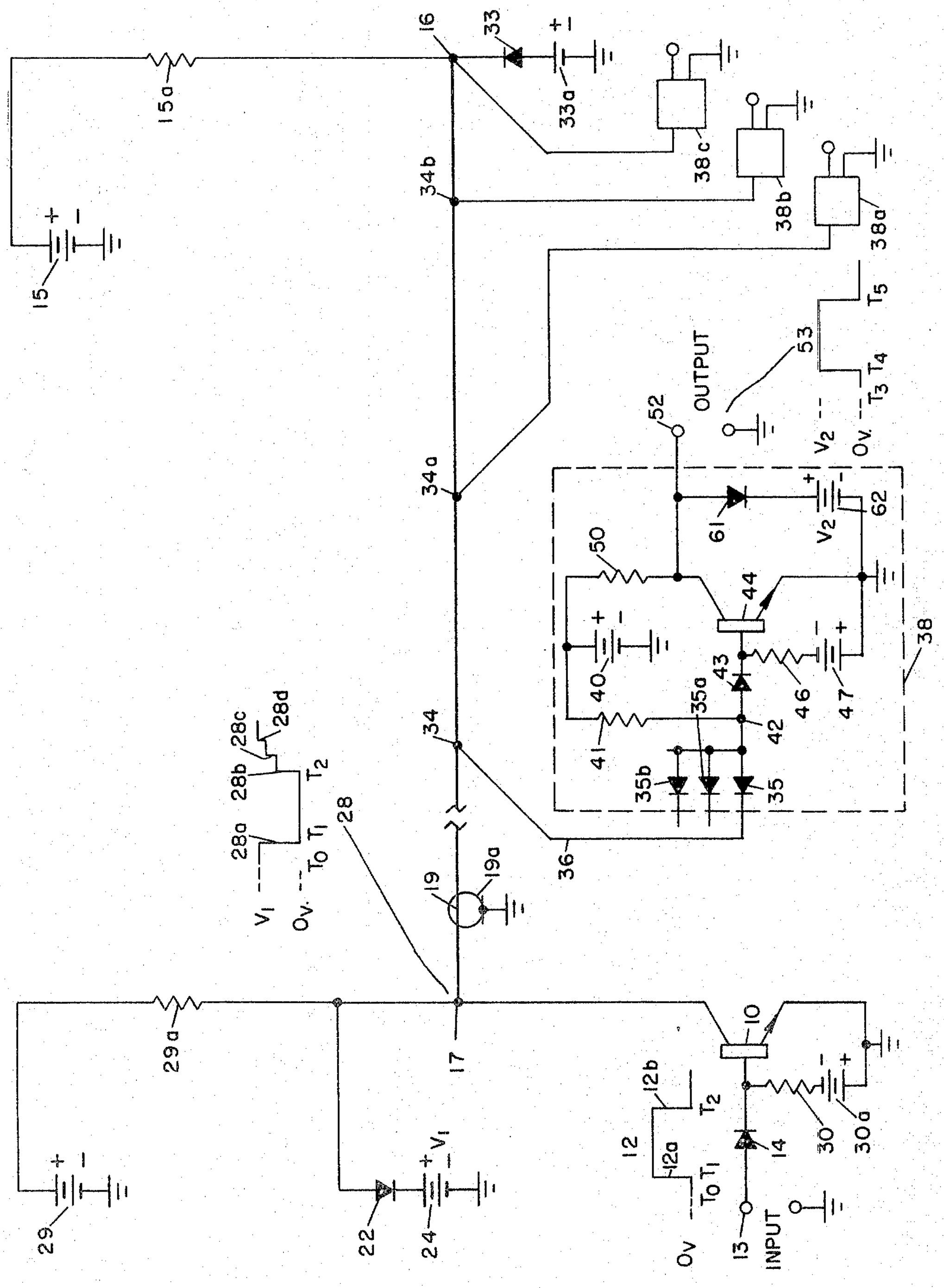
INVENTOR.
HAROLD R. GREENE
BY Allan Ratner
ATTORNEY

United States Patent Office 3,302,035

Patented Jan. 31, 1967

3,302,035

TRANSMISSION SYSTEM

Harold R. Greene, New Shrewsbury, N.J., assignor to Electronic Associates Inc., Long Branch, N.J., a corporation of New Jersey

Filed Apr. 30, 1963, Ser. No. 276,769

12 Claims. (Cl. 307—88.5)

This invention relates to a transmission system and has for an object the provision of transmitting binary information over a transmission line.

In conventional transmission systems harmful reflections are prevented by matching the input circuit to the transmission line and by terminating the transmission line in its characteristic impedance. However, mismatch problems arise when binary isgnals are transmitted over the transmission line and applied to logical elements. Specifically these problems result from the fact that the source of binary signals presents one impedance to the input of the transmission line, usually zero impedance, when a bit in a first of the two possible states is produced and presents an impedance other than zero to the line when a bit in a second of the states is produced. Further difficulties are encountered when more than one logical element is connected to the transmission line and connected at differing points on the line. Accordingly, in at least some of the prior systems the transmission line is terminated in a non-linear impedance element so that the terminating impedance is at least equal to, or below, the characteristic impedance of the line. However, the prior systems left something to be desired in rapid response to the binary signals and in providing for low input impedance logical elements connected to differing points on the line.

Accordingly, a principal object of the present invention is a transmission system in which logical elements are permitted to be connected to differing points on the transmission line with these logical elements being rapidly switched between their stable states.

Another object of the present invention in a low level logic transmission system having a reflection coefficient of a first reflection of incident waves on the transmission line, which coefficient is equal to or greater than zero whereby the logical elements may be connected to selected points on the transmission line.

Still another object of the present invention is a transmission system in which low input impedance logical elements are connected to differing points on the transmission line and are fully switched between their stable states only by the incident wavefronts flowing down the line.

Still another object of the present invention is a system for transmitting binary signals in which there are eliminated those harmful reflections which would otherwise erroneously change the state of the logical elements.

In accordance with the present invention there is provided a system for transmitting binary information comprising input circuit means connected to the input end of the transmission line. Input bits are applied to the input circuit means to provide a first incident wave on the line corresponding to a first state bit and to provide a second incident wave on the line corresponding to a second state bit. The impedance across the input end is substantially zero during the time of the first state bit and the impedance is of value other than zero during the time of the second state bit. A source of supply is connected to the transmission line and provides for each of the first incident waves a termination impedance greater in magnitude than the characteristic impedance of the line and also provides a voltage reflection coefficient of the first reflection of the incident waves which coefficient is equal to or greater than zero. Accordingly, logical elements, any or all of which have low input impedances, may be connected to differing points on the line as desired, and there will be provided first and second incident waves of sufficient magnitude to fully switch each of the logical elements from one to the other of their stable states. Further, in accordance with the invention, the output end of the transmission line is shunted by a diode which is rendered conductive only for a first reflection of each first incident wave produced when the impedance across the input end is substantially zero. In this manner harmful reflections are prevented and the logical elements are rapidly switched.

In a preferred form of the invention, the input circuit means includes a device to provide the substantially zero impedance across the input end of the line when the device is conductive and to provide the impedance other than zero across the input end when the device is nonconductive. The source of supply is connected to the end of the transmission line and provides steady state current $I_0$ which flow in the line and may be defined by the following equations:

(1)
$$I_{0}-_{\text{on}}=\frac{V_{I}+_{\text{off}}}{R_0}$$

(2)
$$I_{0}+_{\text{on}}=\frac{V_1}{R_0}+I_{0\ \text{off}}$$

In Equation 1, $I_0-_{\text{on}}$ represents the minimum current in the line when the device is conductive and when the total current drawn by the logical elements is zero. $V_I+_{\text{off}}$ represents the maximum voltage required by the logical elements to switch to a selected one of their states. In Equation 2, $I_0+_{\text{on}}$ represents the maximum allowable current in the line when the device is conductive, and the logical elements all draw full current; $I_{0\ \text{off}}$ represents the current in the transmission line when the device is nonconductive; and $V_1$ represents the maximum potential applied to the input of the line. In both Equations 1 and 2, $R_0$ is representative of the characteristic resistance of the transmission line.

With the foregoing equations satisfied and the devices rendered conductive, the incident wave corresponding to a first state bit is effective to provide a signal to fully switch each of the logical elements. When the incident wave reaches the diode termination of the line, a resultant reflection is shunted between the output terminals by that diode to prevent that reflection from traveling back over the line and generating harmful reflections which would otherwise erroneously change the states of the logical elements. In addition, the incident wave corresponding to a second state bit also provides a signal to fully switch each of the logical elements. Accordingly, the logical elements are each rapidly switched only by the incident waves.

For a more detailed disclosure of the invention and for further objects and advantages thereof, reference is to be had to the following description taken in conjunction with the accompanying drawing, the single figure of which schematically illustrates a transmission system embodying the invention.

Referring to the drawing, the invention in one form has been shown as a low level logic transmission system comprising an input circuit transistor 10 of the NPN switching type. This transistor may be switched between its fully conductive and its fully nonconductive state by means of input pulses 12 which are applied to input terminal 13 and then are transmitted through diode 14 to the base of transistor 10. The first portion of the waveform of the input pulse 12 between times $T_0$ and $T_1$ is of approximately zero potential with respect to ground and is effective to render transistor 10 nonconductive. The positive-going step 12*a* of the waveform 12 at time $T_1$ is effective to render transistor 10 conductive. That transistor will remain conductive between times $T_1$ and $T_2$ at which time the negative-going portion 12b of the waveform is effective to render transistor 10 nonconductive.

It will be assumed that time durations between times $T_0$ and $T_1$ in waveforms 12 and 28, and between times $T_3$ and $T_4$ in waveform 53 each corresponds to a bit in a second state and that the time durations between times $T_1$ and $T_2$ in waveforms 12 and 28 and between times $T_3$ and $T_4$ in waveform 53 each corresponds to a bit in a first state. It will be understood that a first state bit may correspond to a "1" bit, and a second state bit may correspond to a "0" bit, or vice versa. It will also be understood that the first and second state bits may be applied to the input terminal 13 in any sequence and that the sequence described is only for the purpose of explanation.

During the time of the second state bit between times $T_0$ and $T_1$ transistor 10 is nonconductive, and there is provided a very high impedance between its collector and its emitter which is connected to ground. Assuming a steady-state condition, a circuit for current flow may be traced from the positive side of a battery 15 through a resistor 15a, a terminal 16, an active conductor of a transmission line 19, and through a terminal 17, a conductive diode 22, a battery 24, and to ground. The negative side of battery 15 is connected to ground. The foregoing current flow is in the direction described for the reason that battery 15 is selected to have a potential greater than the potential $V_1$ of battery 24.

Accordingly, with transistor 10 nonconductive and diode 22 conductive, the potential at output terminal 17 of the line 19 is maintained at approximately the positive potential $V_1$ of the battery 24 with respect to ground as illustrated by the waveform 28 between times $T_0$ and $T_1$. At this time, the potential $V_1$ also appears over the entire line 19 as well as at its output terminal 16. It will be noted that the collector source of supply for the transistor 10 comprises battery 29 having its negative side connected to ground and its positive side connected by way of resistor 29a to terminal 17 and the collector of transistor 10. In addition, the base of transistor 10 is connected by way of resistor 30 and battery 30a to ground. It will be noted that the return conductor 19a of the transmission line is connected to ground so that the input terminal 17 and the output terminal 16 of the line each have a ground potential reference at its respective remaining terminal.

The output terminal 16 of the line 19 is connected to the cathode of a diode 33, the anode of which is connected by way of bias battery 33a to ground. The potential of the bias battery 33a is selected to be approximately equal to the potential drop in the forward direction across the diode 33, which is much smaller in magnitude than the potential $V_1$. Accordingly, between times $T_0$ and $T_1$ with the positive potential $V_1$ appearing at the terminal 16, the diode 33 is maintained nonconductive. In addition, during that time, the positive potential $V_1$ appearing on the transmission line 19 is also applied by way of junctions 34, 34a and 34b to logical elements 38, 38a and 38b, respectively, and by way of terminal 16 to a logical element 38c.

The foregoing logical elements may have substantially low input impedance and may be connected to differing selected points on the transmission line 19. The elements may be of identical construction so that only one of them, logical element 38, will be described in detail. Logical elements of this type are shown and described at pages 7–169 et seq. of the text, "Design of Transistorized Circuits for Digital Computers," John F. Rider, Publisher, Inc., 1959.

Returning again, the potential $V_1$ appearing on the transmission line is applied from junction 34 by way of conductor 36 to the cathode of diode 35 to maintain that diode nonconductive. Diode 35 is one of a plurality of input diodes 35a and 35b (which may be connected to other transmission lines or logical elements) and all of these diodes comprise an OR gate for the logical element 38. As set forth in the foregoing text with all of the OR gate input diodes nonconductive current flow may be traced from the positive side of a battery 40, through a resistor 41, a level shifting diode 43, the base-emitter junction of transistor 44 and then to ground. The negative side of battery 40 is connected to ground. In addition, some of the current flow through diode 43 is diverted to flow through a resistor 46 and a battery 47 to ground. However, the current flow through the base-emitter junction of transistor 44 is of sufficient magnitude to render and maintain that transistor conductive to provide a low impedance path from collector to emitter thereof. As a result current flow through that transistor may also be traced from the positive side of battery 40 through a resistor 50 the collector, base and emitter of conductive transistor 44 and then to ground. Thus the potential at the collector of transistor 44 is approximately equal to ground potential and is applied to the output terminal 52 of the logical element 38. Accordingly, the output of the logical element between times $T_3$ and $T_4$ as illustrated by waveform 53 is approximately equal in value to ground potential which corresponds to the value of the input waveform 12 between times $T_0$ and $T_1$. It will be understood that times $T_3$ and $T_4$ will be displaced in time from times $T_0$ and $T_1$ as a result of the time delay produced by the transmission line 19.

At time $T_1$ a step 12a corresponding to a first state bit is applied to input terminal 13 and is effective to render transistor 10 conductive. As that transistor is rendered conductive there is provided a low impedance path from collector to emitter thereof and the input terminal 17 of the line changes in potential from $V_1$ to approximately the potential of ground. As illustrated by the waveform 28, this abrupt change of potential produces a negative-going step 28a which travels as an incident wave along the transmission line 19. As that wave travels along the line it passes in turn each of the junctions 34, 34a, 34b, and finally reaches the output terminal 16. At the time the incident wave passes each of the junctions, it is effective to fully switch each respective logical element 38, 38a, 38b, and 38c from one to the other of its stable states.

In accordance with the present invention, each of the logical elements is fully switched for the reason that the incident wave of a first state bit is of sufficient magnitude to accomplish this purpose even though any one or all of the logical elements may have a substantially low input impedance. The magnitude of the incident wave is a function of the various circuitry and the values of the circuit components are selected to satisfy the requirements of equations which will later be described in detail. The overall effect is to produce for each of the incident waves of a first state bit a reflection coefficient of a first reflection equal to or greater than zero. In addition, for that incident wave the terminating impedance will have a value greater than the value of the characteristic impedance of the transmission line. In accordance with these requirements of the present invention, the incident wave will have a sufficient magnitude to fully switch each of the logical elements 38, 38a–38c, and at the output terminal 16 produce a reflection of zero or greater magnitude of negative-going direction which falls from the lowest potential level of the incident wave. Specifically, that lowest potential level of the incident wave of a first state bit is approximately equal to zero potential and thus a reflection of negative polarity would be produced but for the operation of diode 33 and its bias 33a.

As previously described, the bias 33a is selected to have a potential equal to the potential drop in a forward direction of the diode 33. Accordingly, diode 33 becomes conductive when the potential at terminal 16 is approximately zero potential and that diode remains conductive for all potentials more negative than zero potential. In this manner, the first reflection of the incident wave at the start of a first state bit is shunted from terminal 16 through diode 33, bias battery 33*a* to ground. With diode 33 conductive, the termination impedance for the first reflection changes from a value that is greater than the characteristic impedance to a value of impedance substantially equal to zero. As a result, that first negative-going reflection is shunted to ground to prevent that reflection from traveling back over the transmission line 19 toward the terminal 17. If that reflection were not shunted at the output circuit of the line, and prevented from traveling back, the following harmful effects would be produced. The negative-going reflection would travel down the line until it reached the input terminal 17. Since transistor 10 is conductive during the time of a first state bit, and acts as a short circuit for the input of the line, that negative-going reflection would reverse in potential and then travel back toward the output terminal 16 as a positive-going waveform. That positive-going wave may be considered as a harmful reflection for the reason that it would have the effect of erroneously switching the logical elements 38, 38*a*–38*c* as that positive going wave passes, in turn, each respective junction 34, 34*a* and 34*b*, until it reaches the output terminal 16. However, in accordance with the present invention, the transmission line is terminated in a diode and biased to be conductive for the first reflection of the incident wave produced when the transistor 10 is rendered conductive. With that first reflection removed, no other reflections will thereafter be produced. With regard to potential levels, diode 33 is biased to be conductive for those potentials which are substantially equal to the lowest potential level of the incident wave corresponding to a first state bit, and for all other potentials beyond that lowest potential level in a direction opposite to the potential of the incident wave of a second state bit. In other words, in the example described, diode 33 will be conductive when the potential of the incident wave at the start of a first state bit at output terminal 16 falls to zero potential, and will remain conductive for all potentials more negative than zero potential.

As above described, the logical element 38 is switched when the incident wave of a first state bit travels past junction 34 for the reason that the cathode of diode 35 is brought to approximately ground potential. As a result diode 35 is rendered conductive and the current from battery 40 which previously flowed through diode 43 is now switched to flow through diode 35, conductor 36, junction 34, line 19, conductive transistor 10, and then to ground. Accordingly, battery 40 no longer supplies the current to maintain conductive to base-emitter circuit of transistor 44. In addition, with diode 43 nonconductive the battery 47 is effective to apply a negative potential to the base of that transistor to render it fully nonconductive. With transistor 44 nonconductive there is provided a high impedance path between its collector and emitter and the potential at the collector rises in value until that potential is sufficiently more positive than the potential $V_2$ of battery 62 to render diode 61 conductive. With diode 61 conductive the collector of transistor 44 is connected by way of that conductive diode to the positive side of battery 62. In this manner that collector as well as the output terminal 52 are maintained at approximately the positive potential $V_2$ as illustrated by the output waveform 53. Accordingly, between times $T_4$ and $T_5$ there is provided a bit in a first state which corresponds to the input first state bit between times $T_1$ and $T_2$ as illustrated by input waveform 12.

At time $T_2$ a negative-going step pulse 12*b* corresponding to a second state bit is applied to the input terminal 13 and is effective to render transistor 10 nonconductive. As transistor 10 is rendered nonconductive there is provided a high impedance path from collector to emitter thereof to produce a positive-going incident wave 28*b*, as illustrated by the waveform 28. This incident wave 28*b* starts at terminal 17 and begins to travel down the transmission line. The value of the incident wave 28*b* produced at terminal 17 may be calculated by tracing current flow from the positive side of battery 15, resistor 15*a*, transmission line 19 and through the line to ground. Accordingly, the potential of wave 28*b* is not equal to the potential $V_1$ for the steady state condition but is of sufficient magnitude to fully switch each of the logical elements 38, 38*a*–38*c* as that incident wave travels along the line and passes, in turn, each of the respective junctions 34, 34*a*, 34*b*, and then finally reaches the output terminal 16. In accordance with the present invention, that incident wave 28*b* is of sufficient magnitude to fully switch each of the logical elements for the reason that the value of that incident wave produced when transistor 10 is rendered nonconductive satisfies the requirements of equations which will later be described in detail. With these equations satisfied, it will be remembered that the reflection coefficient of the first reflection is equal to or greater than zero. As a result, a reflection is produced by the incident wave 28*b* at the output terminal 16 in a positive-going direction which rises from the upper potential level of that incident wave. Accordingly, a resultant wave travels back over the transmission line toward the input terminal 17. Since transistor 10 is nonconductive, the resultant wave produces another positive-going reflection at 28*c* and that new resultant wave travels back over the transmission line toward the output terminal 16. The foregoing steps are repeated for the reflection at 28*d* and until a steady state condition is achieved equal to $V_1$.

It will be observed that none of the positive-going reflections at 28*c* or 28*d* will have any effect upon the logical elements for the reason that the initial incident wave 28*b* was also positive-going and of sufficient magnitude to fully switch all of the elements. During the time of these reflections, transistor 10 is nonconductive and the reflections produced at both terminals, 16 and 17, will be in a positive-going direction and none of these reflections will erroneously switch the logical elements. These reflections merely increase the positive potential applied to the elements and thus have no adverse effect on the logical elements.

As above described, the logical element 38 is switched when the incident wave travels past junction 34 for the reason that the cathode of diode 35 is brought to a sufficiently positive potential to render diode 35 nonconductive. It will be understood that the potential applied to the cathode of that diode must be of positive polarity and of magnitude slightly greater than the potential appearing at point 42 in order to render diode 35 nonconductive. With diode 35 nonconductive current flow from the battery 40 is switched at the point 42 to again flow through the diode 43 and through the base-emitter circuit of transistor 44 to render that transistor conductive as previously described in detail. With transistor 44 conductive the potential at the output terminal 52 drops to approximately zero or ground potential at time $T_5$ as illustrated by the waveform 53 which corresponds to the input waveform 12.

In accordance with the present invention in order to meet the above-described incident wave requirements in which each of the incident waves fully switches each of the logical elements, the following equations must be satisfied:

$$I_{0-\mathrm{on}}=\frac{V_{1+\mathrm{off}}}{R_0} \quad (1)$$

$$I_{0+\mathrm{on}}=\frac{V_1}{R_0}+I_{0\,\mathrm{off}} \quad (2)$$

Equation 1 has been derived on the basis that transistor 10 has just been rendered nonconductive, and Equation 2 has been derived on the basis that transistor 10 has just been rendered conductive. In both Equations 1 and 2, $I_{0\,on}$ represents the steady state currents in the transmission line when transistor 10 is conductive and measured at a time just prior to the time that transistor 10 is rendered nonconductive. In both equations, $R_0$ represents the characteristic resistance of the transmission line 19. In Equation 1, $I_0 -_{on}$ represents the minimum current in the transmission line when the total current drawn by each of of the logical elements 38, 38*a*–38*c* is zero. This value of current is determined, in large part, by the values of battery 15, resistor 15*a*, transmission line 19 (which, for this purpose, may be considered a short circuit between terminals 16 and 17) and conductive transistor 10. $V_I +_{off}$ represents the maximum positive potential required on the transmission line 19 in order to render diode 35 nonconductive. As previously described, that positive potential is required to be equal to or greater than the potential at point 42 in order to achieve the purpose of switching diode 35 to its nonconductive state. It will be observed that if any one of the remaining logical elements 38*a*–38*c* has a higher requirement than element 38, then $V_I +_{off}$ must be sufficient to meet that requirement.

In Equation 2, $I_0 +_{on}$ represents the maximum allowable current in the line 19 when all of the logical elements 38, 38*a*–38*c* draw full current. Accordingly, in calculating the value of $I_0 +_{on}$ the current in the line 19 should include not only the current supplied by battery 15 but also the current supplied by battery 40 through resistor 41 of each of the logical elements. $I_{0\,off}$ represents the current in the transmission line 19 when transistor 10 is nonconductive. At that time, it will be remembered that the steady state current flows from battery 15, resistor 15*a*, through line 19, diode 22, battery 24, and then to ground. It will be understood that in Equations 1 and 2 the values of the components and, in particular, the values of battery 15 and resistor 15a, are selected so that the differing values of current and voltage will be limited by the values given by the equation. Thus, the selected values may be chosen to be inside the limits, but not outside the limits defined by the equations.

The terms defined in Equations 1 and 2 may also be expressed in the following manner. In particular, in Equation 1:

$$I_0 -_{on} = \frac{\text{Potential of battery 15} - V_{I\,on}}{\text{Resistance value of resistor 15a}} \tag{3}$$

In Equation 3, $V_{I\,on}$ represents the minimum positive potential required on the transmission line 19 in order to render diode 35 conductive.

In Equation 2, $$I_0 +_{on} = F_0 I_I + \frac{\text{Potential of battery 15}}{\text{Resistance value of resistor 15a}} \tag{4}$$

$$I_{0\,off} = \frac{\text{Potential of battery 15} - V_I}{\text{Resistance value of resistor 15a}} \tag{5}$$

In Equation 4, $F_0$ represents the number of logical elements that are connected to the transmission line 19. In the example illustrated in the drawing, four logical elements are connected to line 19. In addition, in Equation 4, $I_I$ represents the maximum current that any one of the logical elements may draw.

In the foregoing manner, there has been defined a transmission line having a reflection coefficient for first reflections equal to or greater than zero and having for the incident wave corresponding to a first state bit, a terminating impedance greater than the characteristic impedance of the transmission line. Thus, in accordance with the present invention, the logical elements are each rapidly switched between their stable states by the incident waves, and there are eliminated such harmful reflections which would erroneously change the states of the logical elements. Further in accordance with the invention, the logical elements may have low input impedances and may be connected to one or differing selected points on the transmission line. Further, all of the elements may be connected to the end of the line and such connections of elements or quantity of elements will be limited only by the requirements of the equations and for no other reasons.

It will be understood that reflections may occur at junctions 34, 34*a*, and 34*b* since these junctions represent discontinuities in the transmission line 19. However, in accordance with the invention, as long as the foregoing equations are satisfied these reflections occurring at the junctions will have no adverse or harmful effect on the transmission system.

It is to be understood that more than one transmission line may be connected to the collector of transistor 10 so that one source of bits may drive a plurality of transmission lines. In addition, the transmission line 19 may be of any desired length and may be selected to be any one of the well-known types, such as a twisted pair or a co-axial line. It will also be understood that transistor 10 may be selected to be of the PNP type with corresponding reversal of the polarity of the batteries 15, 24, 29 and 33*a* and the corresponding reversal of the connections of the diodes 22 and 33. The polarity of waveforms 12, 28, and 53 will all be reversed from those described and illustrated and the logical elements 38, 38*a*–38*c* will be designed to receive such signals in the manner described in the above-cited text, "Design of Transistorized Circuits for Digital Computers."

For the example used in the above description, but with seven logical elements instead of four, the various components may have the following values;

| | | |
|---|---|---|
| Resistor 15*a* | ohms | 460 |
| Resistor 29*a* | do | 1500 |
| Characteristic resistance of the transmission line 19 | do | 125 |
| Battery 15 | volts | 12 |
| Battery 24 | do | 5 |
| Battery 29 | do | 12 |
| $F_0$ | | 7 |
| $V_I +_{off}$ | volts | 3 |
| $V_{I\,on}$ | do | 1 |
| $I_I$ | milliamperes | 4 |

The principles of the invention having now been explained together with modifications thereof, it is to be understood that many more modifications may be made all within the spirit and scope of the following claims.

What is claimed is:

I claim:

1. A system for transmitting binary information in the form of bits having first and second states, comprising
   at least one transmission line having input terminals and output terminals,
   input means having said bits applied thereto, said input means being connected to said input terminals to provide a first incident wave on said line corresponding to a first state bit and to provide a second incident wave on said line corresponding to a second state bit, the impedance across said input terminals being substantially zero during the time of a first state bit and being of value other than zero during the time of a second state bit,
   a plurality of logical elements each operable between two stable states and connected to differing points on said transmission line,
   means including a diode connected across said output terminals and biased to be conductive only for a first reflection of each of said first incident waves produced when the impedance across said input terminals is substantially zero, and
   means including a source of supply connected to said transmission line for providing at said output terminals for each of said first incident waves a termination impedance greater in magnitude than the characteristic impedance of said transmission line whereby each of said first and said second incident waves is of sufficient magnitude to fully switch each of said logical elements from one to the other of its stable states.

2. The system of claim 1 in which there is provided a device operable between a nonconductive state and a conductive state in response to said input bits, and means connecting said device to said input terminals to provide said substantially zero impedance across said input terminals when said device is conductive and to provide said impedance other than zero across said input terminals when said device is nonconductive.

3. A system for transmitting binary information in the form of bits having first and second states, comprising at least one transmission line having an input end and an output end, input circuit means connected to said input end of said transmission line, means for applying said bits to said input circuit means to provide a first incident wave on said line corresponding to a first state bit and to provide a second incident wave on said line corresponding to a second state bit, the impedance across said input end being substantially zero during the time of a first state bit and being of value other than zero during the time of a second state bit, a plurality of logical elements each operable between two stable states and connected to differing points on said transmission line, means including a diode connected across said output end and biased to be normally nonconductive and to be conductive only for a first reflection of each of said first incident waves produced when the impedance across said input end is substantially zero to prevent said first reflection from traveling back over said line and generating harmful reflections which would otherwise erroneously change the states of said logical elements, and means including a source of supply connected to said output end for providing at said output end a reflection coefficient of a first reflection of each of said incident waves equal to or greater than zero and for providing for each of said first incident waves a termination impedance greater in magnitude than the characteristic impedance of said transmission line whereby each of said first and said second incident waves is of sufficient magnitude to fully switch each of said logical elements from one to the other of its stable states.

4. The system of claim 3 in which said source of supply comprises a battery and a resistor connected in series circuit relation and means connecting said series circuit across said output end of said transmission line.

5. The system of claim 3 in which there is provided a bias battery connected to said diode in series circuit relation and means connecting said series circuit across said output end of said transmission line.

6. The system of claim 3 in which said input circuit means includes at least one transistor having an output terminal connected to said input end of said transmission line and means for rendering said transistor conductive and nonconductive in response to said input bits.

7. A system for transmitting binary information applied in the form of input bits having first and second states, comprising at least one transmission line having input terminals and output terminals, means including at least one source of supply connected to said transmission line, means responsive to said input bits to provide a substantial short circuit across said input terminals for producing a first incident wave on said line corresponding to a first state bit and to provide an impedance other than zero across said input terminals for producing a second incident wave on said line corresponding to a second state bit, at least one logical element operable between two stable states being connected to a selected point on said transmission line, and means including a diode connected across said output terminals and biased to be conductive only for the first reflection of each of said first incident waves produced when said input terminals are effectively short-circuited whereby the termination impedance for said first reflection of said first incident wave has a value of impedance substantially equal to zero and the termination impedance for said first incident wave has a value of impedance greater in magnitude than the characteristic impedance of said transmission line.

8. A system for transmitting binary information in the form of bits having first and second states, comprising at least one transmission line having an input end and an output end, input means connected to said input end of said line and including a device which is rendered conductive to provide a first incident wave on said line corresponding to a first state bit and which is rendered nonconductive to provide a second incident wave on said line corresponding to a second state bit, a plurality of logical elements operable between two stable states and connected to predetermined points on said transmission line, means including a normally nonconductive diode connected across said output end and biased to be conductively only for a first reflection of each of said first incident waves, and means including at least one source of supply connected to said output end to provide for steady-state currents $I_0$ for flow in the transmission line with $$I_{0-\mathrm{on}}=\frac{V_{\mathrm{I}+\mathrm{off}}}{R_0}$$

$$I_{0+\mathrm{on}}=\frac{V_1}{R_0}+I_{0\,\mathrm{off}}$$

where $I_{0-\mathrm{on}}$ represents the minimum current in the line during the time of said first state bit and when the total current drawn by said logical elements is zero, $V_{\mathrm{I}+\mathrm{off}}$ represents the maximum voltage required by said logical elements to switch to a selected one of their stable states, $I_{0+\mathrm{on}}$ represents the maximus allowable current in said transmission line during the time of said first state bit and with said logical elements drawing full current, $I_{0\,\mathrm{off}}$ represents the current in said transmission line during the time of said second state bit, $V_1$ represents the maximum potential applied to said input terminals, whereby each of said first and said second incident wave is of sufficient magnitude to fully switch each of said logical elements from one to the other of its stable states.

9. The system of claim 8 in which said source of supply comprises a battery and a resistor connected in series circuit relation and means connecting said series circuit across said output end of said transmission line.

10. The system of claim 8 in which there is provided a bias battery connected to said diode in series circuit relation and means connecting said series circuit across said output end of said transmission line.

11. A pulse transmission system comprising a transmission line having input terminals and output terminals, source means including means for substantially shorting said input terminals corresponding to a first pulse to provide a first incident wave on said line and for producing a predetermined potential across said input terminals corresponding to a second pulse to provide a second incident wave on said line, a plurality of logical elements each having two stable states connected to said transmission line, means including at least one source of supply for said transmission line to provide for steady state currents $I_0$ for flow in the transmission line with $$I_0 -{}_{on} = \frac{V_I +{}_{off}}{R_0}$$

$$I_0 +{}_{on} = \frac{V_1}{R_0} + I_{0\ off}$$

where $I_0 -{}_{on}$ represents the minimum current in the line with said input terminals shorted and when the total current drawn by said logical elements is zero, $V_I +{}_{off}$ represents the maximum voltage required by said logical elements to switch to a selected one of their stable states, $I_0 +{}_{on}$ represents the maximum allowable current in said transmission line with said input terminals shorted and with said logical elements drawing full current, $I_{0\ off}$ represents the current in said transmission line during the time of each second pulse, $V_1$ represents the maximum potential applied to said input terminals, thereby to provide for each of said first incident waves a termination impedance greater in magnitude than the characteristic impedance of said transmission line whereby said first and said second incident waves are of sufficient magnitude to fully switch said logical elements from one to the other of their stable states, and means including a diode connected across said output terminals and biased to be normally nonconductive and to be conductive only for the first reflection of each of said first incident waves produced when said input terminals are substantially shorted to prevent said first reflections from traveling back over said line and generating harmful reflections.

12. A system for transmitting over a transmission line binary information in the form of bits having first and second states, comprising a source of input bits for providing input first state bits and input second state bits, each of said first state bits corresponding to a reference potential and each of said second state bits corresponding to a predetermined potential with respect to said reference potential, means connecting said source of input bits to an input of said transmission line, a plurality of logical elements each operable between two stable states and each connected to differing points on said transmission line, means including a source of supply connected to an output of said transmission line for providing at said output for each incident wave corresponding to a first state bit an effective termination impedance greater in magnitude than the characteristic impedance of said transmission line and for providing incident waves corresponding to both said first state bits and said second state bits to fully switch said logical elements from one to the other of their stable states, and means including a diode connected to said output of said line and biased to be normally nonconductive and to be conductive only for those potentials which are (1) substantially equal to the lowest potential level of said incident wave corresponding to said first state bit, and (2) for all other potentials in a direction opposite to said incident wave corresponding to said second state bit, whereby those reflections which would otherwise have the effect of erroneously changing the state of said logical elements are shunted in said output of said line to prevent those reflections from traveling back over said transmission line.

References Cited by the Examiner

UNITED STATES PATENTS

| | | | |
|---|---|---|---|
| 2,995,667 | 8/1961 | Clapper et al. | 307—88.5 |
| 3,140,405 | 7/1964 | Kolling | 307—88.5 |
| 3,170,038 | 2/1965 | Johnson et al. | 307—88.5 X |
| 3,197,719 | 7/1965 | Wells | 307—88.5 X |
| 3,217,177 | 11/1965 | Walker | 307—88.5 |

ARTHUR GAUSS, *Primary Examiner.*

D. D. FORRER, *Examiner.*